(12) United States Patent
Fukasawa

(10) Patent No.: US 10,539,821 B2
(45) Date of Patent: Jan. 21, 2020

(54) OPTICAL FILM MOVABLE AROUND A DISPLAY PANEL AND A DISPLAY APPARATUS INCLUDING THE SAME

(71) Applicant: Samsung Display Co., LTD., Yongin-si, Gyeonggi-Do (KR)

(72) Inventor: Takayuki Fukasawa, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 191 days.

(21) Appl. No.: 15/867,891

(22) Filed: Jan. 11, 2018

(65) Prior Publication Data
US 2018/0356675 A1 Dec. 13, 2018

(30) Foreign Application Priority Data

Jun. 13, 2017 (KR) .................. 10-2017-0074233

(51) Int. Cl.
| | | |
|---|---|---|
| G02F 1/1333 | (2006.01) | |
| G02B 5/20 | (2006.01) | |
| G02B 7/00 | (2006.01) | |
| G02F 1/1335 | (2006.01) | |
| G09G 3/36 | (2006.01) | |
| G02F 1/133 | (2006.01) | |

(52) U.S. Cl.
CPC ....... *G02F 1/133382* (2013.01); *G02B 5/208* (2013.01); *G02B 7/006* (2013.01); *G02F 1/133553* (2013.01); *G02F 1/13306* (2013.01); *G09G 3/3677* (2013.01); *G09G 3/3688* (2013.01); *G09G 3/3696* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 7,128,951 B2 | 10/2006 | Takeuchi et al. | |
| 7,728,328 B2 | 6/2010 | Kwak | |
| 2006/0002142 A1* | 1/2006 | Jeong | G02F 1/133603 362/612 |
| 2010/0177025 A1* | 7/2010 | Nagata | G02B 6/0028 345/76 |
| 2010/0245370 A1* | 9/2010 | Narayanan | G02B 5/208 345/522 |
| 2017/0205704 A1* | 7/2017 | Nikipelov | G03F 1/62 |

FOREIGN PATENT DOCUMENTS

JP 2009222996 A 10/2009

* cited by examiner

*Primary Examiner* — Ryan Crockett
(74) *Attorney, Agent, or Firm* — Cantor Colburn LLP

(57) ABSTRACT

A display apparatus includes a display panel, an optical film and a radiation element. The display panel displays an image with light. The optical film surrounds the display panel and is movable around the display device. The radiation element makes contact with the optical film to absorb heat from the optical film movable around the display panel.

20 Claims, 13 Drawing Sheets

OPTICAL FILM MOVABLE AROUND A DISPLAY PANEL AND A DISPLAY APPARATUS INCLUDING THE SAME

This application claims priority to Korean Patent Application No. 10-2017-0074233, filed on Jun. 13, 2017, and all the benefits accruing therefrom under 35 U.S.C. § 119, the content of which in its entirety is herein incorporated by reference.

BACKGROUND

1. Field

Exemplary embodiments of the invention relate to a display apparatus. More particularly, exemplary embodiments of the invention relate to a display apparatus including an optical film surrounding a display panel and movable around the display panel to reduce or effectively prevent increase of temperature of the display panel.

2. Description of the Related Art

A display apparatus used in an outdoor environment may abnormally operate or a display quality of the display apparatus may be deteriorated due to increase of temperature by an infrared light ray of the sun. In addition, the display quality of the display apparatus used in an outdoor environment may be deteriorated or a lifetime of the display apparatus may be reduced due to deterioration of materials of the display apparatus by an ultraviolet light ray of the sun.

SUMMARY

Exemplary embodiments of the invention provide a display apparatus in which a display panel is efficiently cooled to improve reliability and a display quality of the display apparatus.

In an exemplary embodiment of a display apparatus according to the invention, the display apparatus includes a display panel, an optical film and a radiation element. The optical film surrounds the display panel and is movable around the display panel. The radiation element makes contact with the optical film to absorb heat from the optical film.

In an exemplary embodiment, the optical film may be an infrared ray absorbing film which absorbs an infrared ray incident thereto.

In an exemplary embodiment, the radiation element may include a plurality of radiation rollers each in contact with the optical film movable around the display panel and spaced apart from each other along the optical film.

In an exemplary embodiment, the radiation element may further include a radiation plate connected to the radiation rollers.

In an exemplary embodiment, each of the radiation rollers may be disposed outside the optical film which surrounds the display panel.

In an exemplary embodiment, each of the radiation rollers may be disposed inside the optical film which surrounds the display panel.

In an exemplary embodiment, the radiation element may further include a radiation plate connected to the radiation rollers. The radiation plate may be disposed outside the optical film which surrounds the display panel.

In an exemplary embodiment, the radiation element may include a first group of the radiation rollers which is disposed outside the optical film which surrounds the display panel; and a second group of the radiation rollers which is disposed inside the optical film which surrounds the display panel.

In an exemplary embodiment, the radiation rollers of the first group may respectively face the radiation rollers of the second group with a portion of the optical film disposed therebetween.

In an exemplary embodiment, the radiation rollers of the first group may each be disposed in a same first row. The radiation rollers of the second group may each be disposed in a same second row.

In an exemplary embodiment, the radiation rollers of the first group may be are rotatable in a rotating direction opposite to a rotating direction of the radiation rollers of the second group.

In an exemplary embodiment, the radiation rollers of the first group and the radiation rollers of the second group may be alternately disposed with each other along the optical film, and a portion of the optical film may be disposed between a first group radiation roller and a second group radiation roller adjacent to each other.

In an exemplary embodiment, the radiation rollers of the first group and the radiation rollers of the second group may be disposed in a same plane as each other.

In an exemplary embodiment, in a top plan view of the display panel surrounded by the optical film, the radiation rollers may be protruded further than the optical film to be disposed outside a side of the optical film.

In an exemplary embodiment, the display apparatus may further include a motor connected to the optical film movable around the display and by which the optical film is movable around the display panel.

In an exemplary embodiment, the display apparatus may further include a display panel driver connected to the display panel to drive the display panel. The display panel driver may be disposed inside the optical film which surrounds the display panel.

In an exemplary embodiment, the display apparatus may further include a display panel driver connected to the display panel to drive the display panel. The display panel driver may be disposed outside the optical film which surrounds the display panel.

In an exemplary embodiment, the display panel may include a first substrate, a second substrate facing the first substrate, an optical medium layer which controls transmittance of light through the display panel to display an image, the optical medium layer disposed between the first substrate and the second substrate; and a reflective plate which reflects external light incident to the display panel, the reflective plate disposed between the first substrate and the optical medium layer.

In an exemplary embodiment of a display apparatus according to the invention, the display apparatus includes a display panel, an infrared ray absorbing film and a plurality of radiation rollers. The display panel includes a first substrate, a second substrate facing the first substrate, an optical medium layer which controls transmittance of light through the display panel to display an image, the optical medium layer disposed between the first substrate and the second substrate, and a reflective plate which reflects external light incident to the display panel, the reflective plate disposed between the first substrate and the optical medium layer; an infrared ray absorbing film which absorbs an infrared ray incident thereto, the infrared ray absorbing film surrounding the display panel to be movable around the display panel; and a plurality of radiation rollers each in contact with the infrared ray absorbing film movable around the display panel to absorb heat from the infrared ray absorbing film.

In an exemplary embodiment, the display apparatus may further include a motor connected to the infrared ray absorbing film movable around the display panel and by which the infrared ray absorbing film is movable around the display panel.

According to one or more exemplary embodiment of the display apparatus, the display apparatus includes an infrared ray absorbing film which surrounds the display panel and is movable with respect to the display panel. Thus, the increase of the temperature of the display apparatus due to the infrared ray of the sun may be reduced or effectively prevented.

Accordingly, abnormal operation of the display apparatus due to the increase of the temperature may be reduced or effectively prevented so that the reliability and the display quality of the display apparatus may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
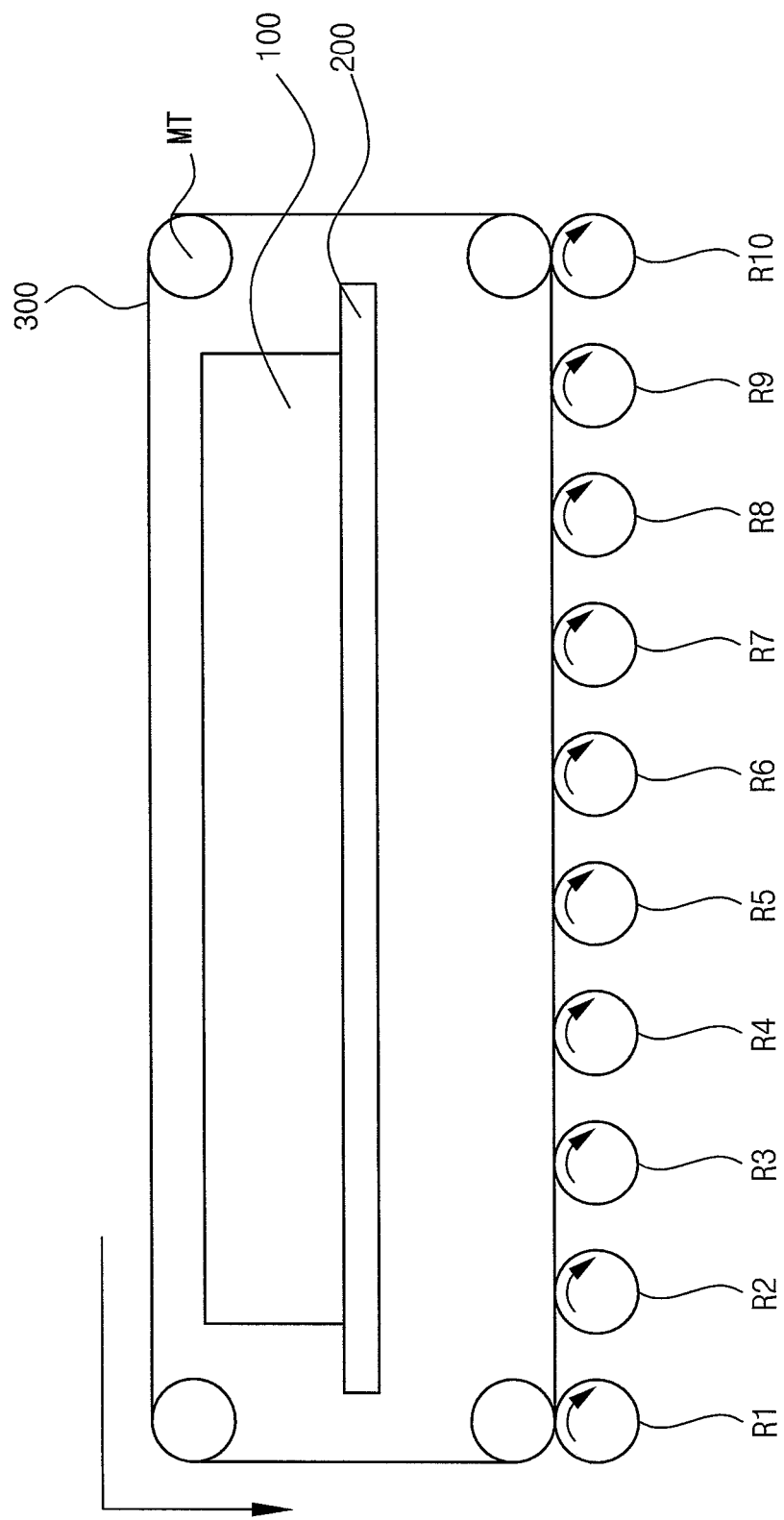
FIG. 1 is a cross-sectional view illustrating an exemplary embodiment of a display apparatus according to the invention.

It will be understood that when an element is referred to as being related to another element such as being "on" another element, it can be directly on the other element or intervening elements may be present therebetween. In contrast, when an element is referred to being related to another element such as being "directly on" another element, there are no intervening elements present. As used herein, a relationship between elements such as being "contacted" or "connected" to each other may indicate a mechanical, physical, electrical or thermal relationship between two elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be explained in detail with reference to the accompanying drawings.

The most sensitive portion of a display apparatus at which a temperature is increased may be a display surface of a display panel within the display apparatus. An air cooling method may be applied to the display apparatus to decrease the temperature of the display surface of the display panel. However, noise due to fricative airflow may be generated in the air cooling method. Alternatively, a rear surface of the display panel may be cooled to decrease the temperature. However, when cooling down the rear surface of the display panel, the display panel may not be efficiently cooled due to a heat insulation effect of an organic layer and an inorganic layer therein.

Figure 2:
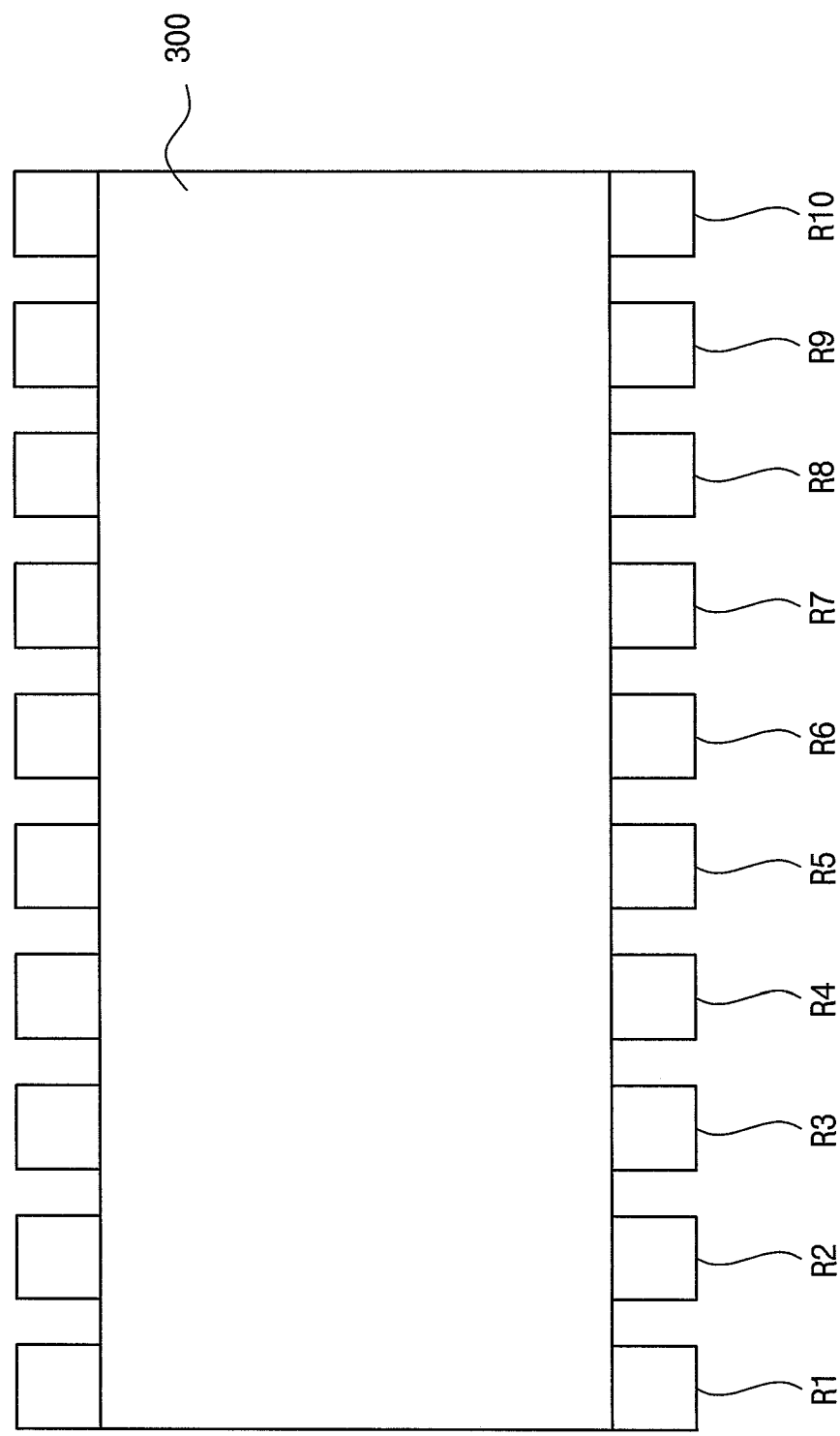
FIG. 2 is a top plan view illustrating the display apparatus of FIG. 1.
Figure 3:
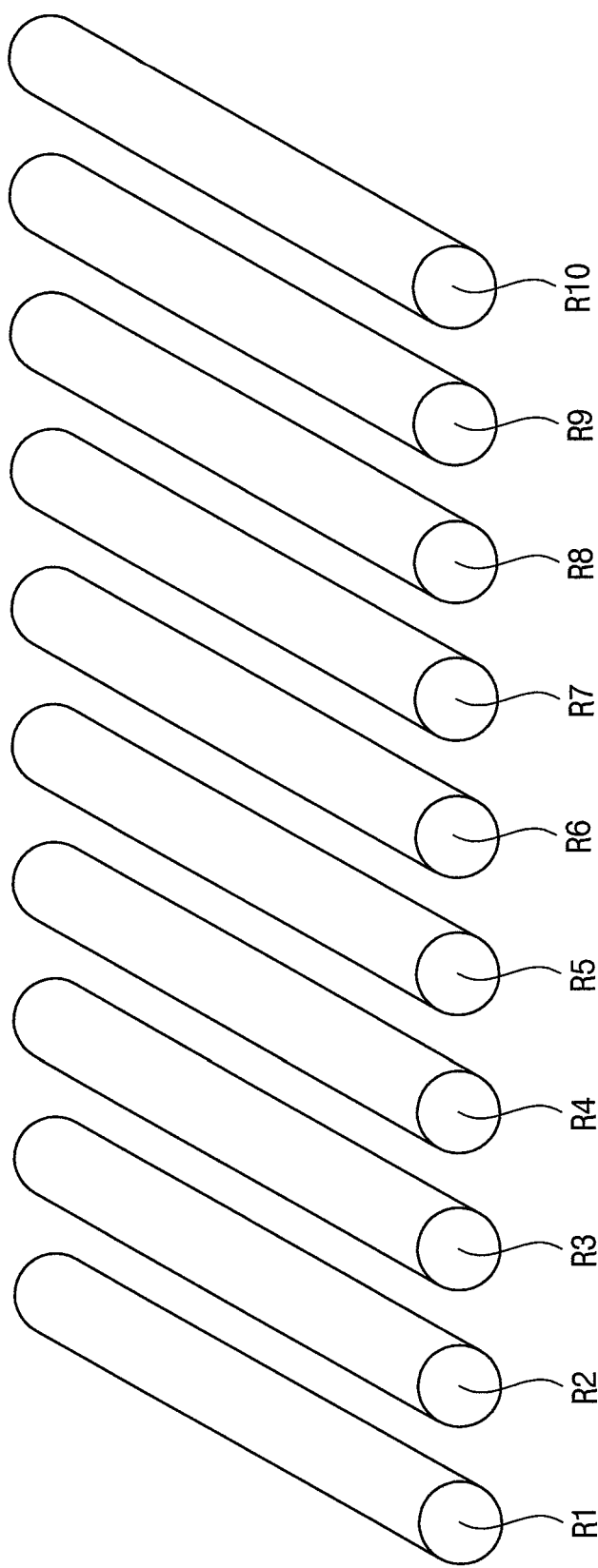
FIG. 3 is a perspective view illustrating an exemplary embodiment of radiation rollers of FIG. 1.

FIG. 1 is a cross-sectional view illustrating an exemplary embodiment of a display apparatus according to the invention. FIG. 2 is a top plan view illustrating the display apparatus of FIG. 1. FIG. 3 is a perspective view illustrating an exemplary embodiment of radiation rollers of FIG. 1.

Referring to FIGS. 1 to 3, the display apparatus includes a display panel 100, a display panel driver 200, an optical film 300 and a radiation element. In an exemplary embodiment, for example, the display apparatus may be an outdoor display apparatus used in an outdoor environment.

The display panel 100 generates and displays an image such as with light. The display panel 100 may be a reflective display panel. The display panel 100 may be a reflective liquid crystal display panel. The display apparatus may not include a light source which generates light, disposed separate from the display panel. The display panel may be a light-generating display panel. The display panel 200 may reflect an external light to display the image. The external light may be the light of the sun.

Figure 5:
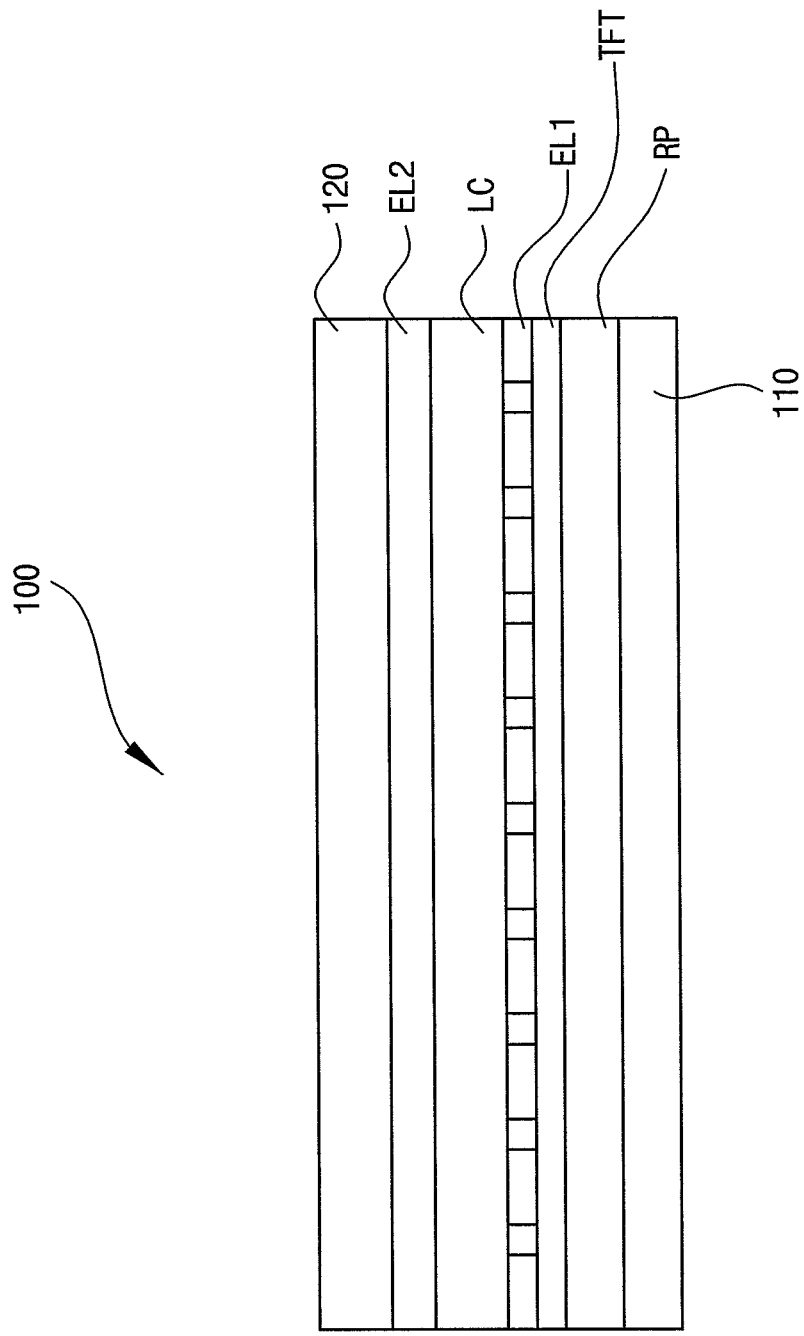
FIG. 5 is a cross-sectional view illustrating an exemplary embodiment of a display panel of FIG. 1.

A structure of the display panel 100 may be explained referring to FIG. 5 in detail.

The display panel driver 200 is connected to the display panel 100 to drive the display panel 100. In an exemplary embodiment, for example, the display panel driver 200 may include a timing controller, a gate driver, a gamma reference voltage generator and a data driver. Control or driving signals may be generated by and/or transmitted from the display panel driver 200 to drive the display panel 100 to generate and display the image.

In the present exemplary embodiment, the display panel driver 200 makes contact with the display panel 100. The optical film 300 surrounds the display panel 100 and forms a closed surface (member) surrounding the display panel 100. The optical film 300 may define an outer surface of the display apparatus. The optical film 300 is disposed between a display surface of the display panel 200 and an outside environment such as where the sun is disposed relative to the display apparatus. The display panel driver 200 may be disposed within the closed surface formed by the optical film 300.

The timing controller may receive input image data and an input control signal from an apparatus (not shown) external to the display panel 100 and/or the display apparatus. The timing controller may generate a first control signal, a second control signal, a third control signal and a data signal based on the input image data and the input control signal.

The timing controller may generate the first control signal for controlling an operation of the gate driver based on the input control signal, and output the first control signal to the gate driver.

The timing controller may generate the second control signal for controlling an operation of the data driver based on the input control signal, and output the second control signal to the data driver.

The timing controller may generate the data signal based on the input image data. The timing controller may output the data signal to the data driver.

The timing controller may generate the third control signal for controlling an operation of the gamma reference voltage generator based on the input control signal, and output the third control signal to the gamma reference voltage generator.

The gate driver generates gate signals which are applied to conductive signal lines (e.g., gate lines) of the display panel 100 in response to the first control signal received from the timing controller. The gate driver may sequentially output the gate signals to the gate lines.

The gamma reference voltage generator generates a gamma reference voltage in response to the third control signal received from the timing controller. The gamma reference voltage generator provides the gamma reference voltage to the data driver. The gamma reference voltage has a value corresponding to a level of the data signal.

The data driver receives the second control signal and the data signal from the timing controller, and receives the gamma reference voltages from the gamma reference voltage generator. The data driver converts the data signal into data voltages having an analog type using the gamma reference voltages. The data driver may output the data voltages to conductive signal lines (e.g., data lines) of the display panel 100.

The optical film 300 surrounds the display panel 100 and is movable to be displaced in a path surrounding the display panel 100. The optical film 300 may form a closed surface surrounding the display panel 100. The optical film 300 may surround the display panel 100 on all sides thereof, to completely enclose the display panel 100. The optical film 300 may be considered as having a closed shape surrounding the display panel 100, such as to provide a closed surface surrounding the display panel 100.

The optical film 300 is spaced apart from the display panel 100. A distance between the optical film 300 and the display panel 100 may be set to minimize decrease of light transmittance due to difference of refractive index between the optical film 300 and a (base) substrate of the display panel 100.

The display apparatus may include at least one motor MT to displace the optical film 300 relative to the display panel 100 (refer to the right-angle arrow in FIG. 1 outside the optical film 300). In an exemplary embodiment, for example, in FIG. 1, the display apparatus may have an overall rectangular shape in cross-section, which defines four vertexes of the display apparatus in the cross-section. The display apparatus include four motors respectively disposed at the four vertexes of the rectangular shape to displace the enclosed optical film 300 in a path relative to the display panel 100.

The optical film 300 may be an infrared ray absorbing film to absorb infrared light rays and to pass or transmit a visible light ray. The absorption of the infrared light rays may generate heat within the optical film 300. The characteristics of the optical film 300 may be explained referring to FIG. 4 in detail.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat transmitted from the optical film 300 to outside of the display apparatus.

In an exemplary embodiment, for example, the radiation element may include a plurality of radiation rollers R1 to R10. The radiation rollers R1 to R10 may respectively have a cylindrical shape.

Although the radiation element includes ten radiation rollers R1 to R10 in the present exemplary embodiment, the invention is not limited thereto. The radiation element may include more than ten or less than ten radiation rollers as the radiation element.

The radiation rollers R1 to R10 may respectively rotate according to a velocity of displacing the optical film 300. In an exemplary embodiment, for example, the radiation rollers R1 to R10 may not be driven by a power source but may instead naturally rotate according to the movement of the optical film 300 by contacting the optical film 300. Alternatively, the radiation rollers R1 to R10 may be driven to rotate by the power source.

The display apparatus and components thereof are disposed in a plane, such as one defined by first and second directions which cross each other. The first and second directions may be perpendicular to each other, but the invention is not limited thereto. A top plan view may be taken in a direction normal to the plane defined by the first and second directions. A thickness of the display apparatus and components thereof is defined in a third direction which crosses each of the first and second directions, such as being perpendicular thereto.

Referring to FIG. 2, the radiation rollers R1 to R10 may be protruded further than the optical film 300, such as being protruded further than a side of the optical film 300 toward outside thereof in a top plan view. In an exemplary embodiment, for example, the radiation rollers R1 to R10 may be protruded further than a relatively longer side of the optical film 300 toward the outside thereof in the top plan view. The radiation rollers R1 to R10 are protruded further than the side of the optical film 300 toward the outside in the top plan view so that the heat transmitted to the radiation rollers R1 to R10 may be efficiently released to outside of the display apparatus.

In an exemplary embodiment, each radiation roller may have a length defined extended in a first direction (e.g., vertical in FIG. 2) and a width which is smaller than the length, extended in a second direction (e.g., horizontal in FIGS. 2 and 3). In an exemplary embodiment, for example, the radiation rollers R1 to R10 may be arranged spaced apart from one another by a uniform gap therebetween, in the second direction.

In the present exemplary embodiment, the radiation rollers R1 to R10 may be disposed to extend further than (e.g., out of) the closed surface formed by the optical film 300.

Figure 4:
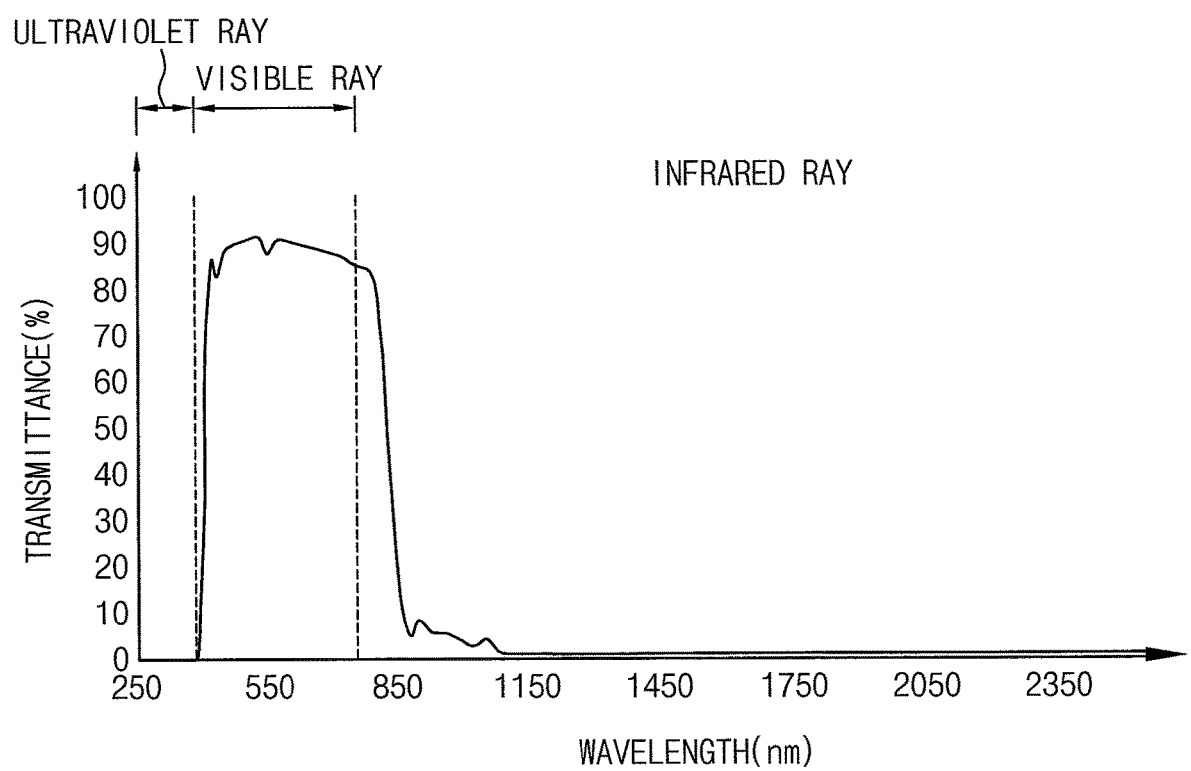
FIG. 4 is a graph illustrating characteristics of an exemplary embodiment of an optical film of FIG. 1.

FIG. 4 is a graph illustrating characteristics of an exemplary embodiment of the optical film 300 of FIG. 1.

Referring to FIG. 4, the optical film 300 may absorb light in an infrared ray range and pass light in a visible ray range.

In an exemplary embodiment, for example, the transmittance (in percent, %) of light in the infrared ray wavelength (in nanometers, nm) range through the optical film 300 may be less than about 10%. The absorption of light in the infrared ray wavelength range by the optical film 300 may be equal to or greater than about 90%. That is, a temperature of the optical film 300 may be increased by heat from the absorbed infrared light.

In an exemplary embodiment, for example, the transmittance of light in the visible ray wavelength range through the optical film 300 may be equal to or greater than about 80%.

In an exemplary embodiment, for example, the transmittance of light in the ultraviolet ray wavelength range through the optical film 300 may be about 0%.

The optical film 300 may include polyethylene terephthalate ("PET"). Alternatively, the optical film 300 may include an acrylic material.

FIG. 5 is a cross-sectional view illustrating an exemplary embodiment of the display panel 100 of FIG. 1.

Referring to FIG. 5, the display panel 100 includes a first (base) substrate 110, a second (base) substrate 120 facing the first substrate 110 and an optical medium (or light transmittance) layer LC disposed between the first substrate 110 and the second substrate 120. The optical medium layer LC may include a liquid crystal layer, however, the invention is not limited thereto. The optical medium layer is hereinafter referred to as a liquid crystal layer LC.

A reflective plate RP is disposed on the first substrate 110. The reflective plate RP reflects an external light irradiated through the second substrate 120 and the liquid crystal layer LC, back toward the liquid crystal layer LC and the second substrate 120.

A control circuit layer TFT may be disposed on the reflective plate RP. The control circuit layer TFT may include a plurality of switching elements such as thin film transistors, and is hereinafter referred to as the thin film transistor layer TFT. The thin film transistor layer TFT include circuitry (e.g., signal lines, active layers, etc.) for controlling the pixels to generate and display the image.

The thin film transistor layer TFT may be disposed on a first electrode layer EL1. The first electrode layer EL1 may include a plurality of pixel electrodes. Each pixel electrode may be connected to a thin film transistor. In an exemplary embodiment, for example, each pixel electrode may be connected to a drain electrode of the thin film transistor.

A second electrode layer EL2 may be disposed to face the first electrode layer EL1 with respect to the liquid crystal layer LC. The liquid crystal layer LC may be disposed between the first electrode EL1 and the second electrode EL2. The second electrode layer EL2 may include a common electrode. The common electrode may be disposed or formed in an entire (planar) area of the second electrode layer EL2.

The second substrate 120 may be disposed on the second electrode layer EL2. An upper surface of the second substrate 120 may be or form a display surface of the display panel 100.

A displacing velocity of the optical film 300 may be determined as follows.

A heat quantity of the sun may be about 1000 watts per square meter (W/m$^2$). The heat quantity of the sun may decrease about $\frac{1}{100}$ of the 1000 W/m$^2$ according to a latitude and an angle of the light of the sun. The heat quantity of the sun according to a position of the display apparatus may be represented as Q kilowatts per square meter (kW/m$^2$), where Q represents a metric unit of distance equal to exactly 0.25 millimeters.

The displacing velocity of the optical film is V meters per second (m/s). A width of the optical film 300 may be about 1 meter (m). A height (or length) of the optical film 300 may be about 1 m. The width and height may be taken in a (flat) plane of the optical film. A thickness of the optical film 300 may be about 100 micrometers (um).

A specific gravity and a specific heat of the optical film 300 may be similar to a specific gravity and a specific heat of polyethylene terephthalate ("PET"). The specific gravity of the optical film 300 may be about to 1.4×10$^3$ kilograms per cubic meter (kg/m$^3$). The specific heat of the optical film 300 may be about 1×10$^3$ joule/kilogram/Kelvin (J/(kg·K)).

A multiplication of a volume of the optical film 300 which displaces or moves for a second of time and the specific gravity of the optical film 300 is 1 m×1 m×0.1/10$^3$ m×V (m/s)×1.4×10$^3$ kg/(m$^3$)=0.14×V (kg).

If it is assumed that the heat is not released from the optical film 300, the increase of S degrees Celsius per second (° C./s) of the temperature due to the light of the sun for a second in time is S=Q×10$^3$ W/m$^2$/(1×10$^3$×(0.14×V))=1/(0.14×V)×Q, V×S=1/0.14×Q=7.14×Q.

As a summary, when the heat quantity of the sun is Q kW/m$^2$, the displacing velocity of the optical film 300 is V m/s, the increase velocity of the temperature due to the light of the sun is S ° C./s, and the characteristics of the optical film 300 is substantially the same as the characteristics of PET, V×S=7.14×Q.

If Q is changed from 1 to 0.01 and S is 10° C./s, then the displacing velocity of the optical film 300 is in a range of about 7.14 millimeters per second (mm/s) and about 714 mm/s.

In a wider temperature range, the displacing velocity of the optical film 300 may be determined in a range of about 1 mm/s and about 1000 mm/s. In an exemplary embodiment, for example, the displacing velocity of the optical film 300 may be about 200 mm/s.

According to the present exemplary embodiment, the display apparatus includes the infrared ray absorbing film 300 surrounding the display panel 100 and movable with respect to the display panel 100. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 6:
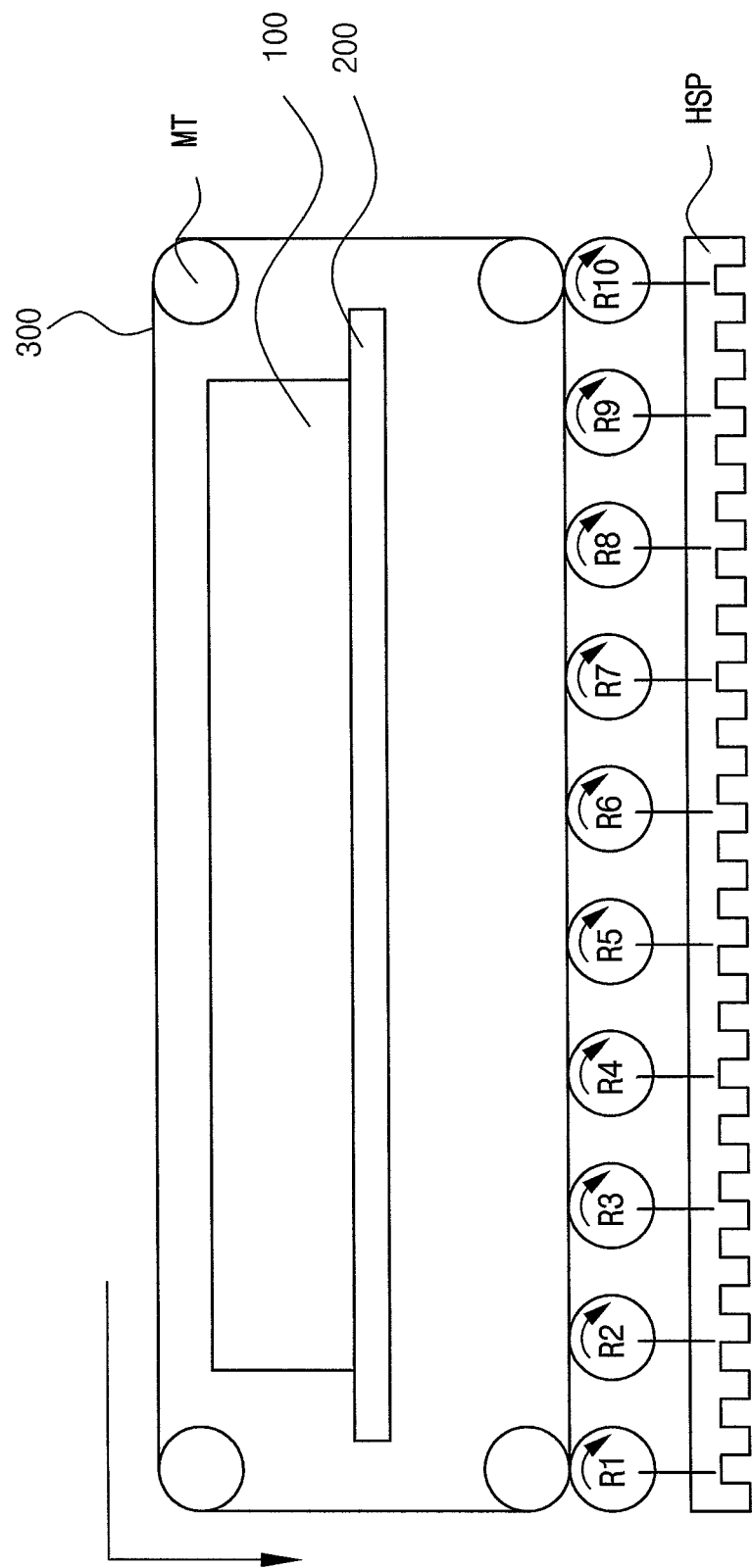
FIG. 6 is a cross-sectional view illustrating a modified exemplary embodiment of a display apparatus according to the invention.

FIG. 6 is a cross-sectional view illustrating a modified exemplary embodiment of a display apparatus according to the invention.

The display apparatus according to the present exemplary embodiment is substantially the same as the display apparatus of the previous exemplary embodiment explained referring to FIGS. 1 to 5 except that the display apparatus further includes a radiation plate connected to the radiation rollers. Thus, the same reference numerals will be used to refer to the same or like parts as those described in the previous exemplary embodiment of FIGS. 1 to 5 and any repetitive explanation concerning the above elements will be omitted.

Referring to FIG. 6, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 6 outside the optical film 300). In an exemplary embodiment, for example, in FIG. 6, the display apparatus may have an overall rectangular shape in cross-section, which defines four vertexes of the display apparatus in the cross-section. The display apparatus include four motors respectively disposed at the four vertexes of the rectangular shape to displace the enclosed optical film 300 in a path relative to the display panel 100.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R10. The radiation rollers R1 to R10 may have cylindrical shapes.

In the present exemplary embodiment, the radiation rollers R1 to R10 may be disposed outside of the closed surface formed by the optical film 300.

In the present exemplary embodiment, the radiation element may further include a radiation plate HSP connected to the radiation rollers R1 to R10. The radiation plate HSP is commonly connected to each of the radiation rollers R1 to R10. The radiation plate HSP is exposed to outside the display apparatus. The increase of the temperature of the display apparatus may be further reduce or effectively prevented by the radiation plate HSP connected to the radiation rollers R1 to R10.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 7:
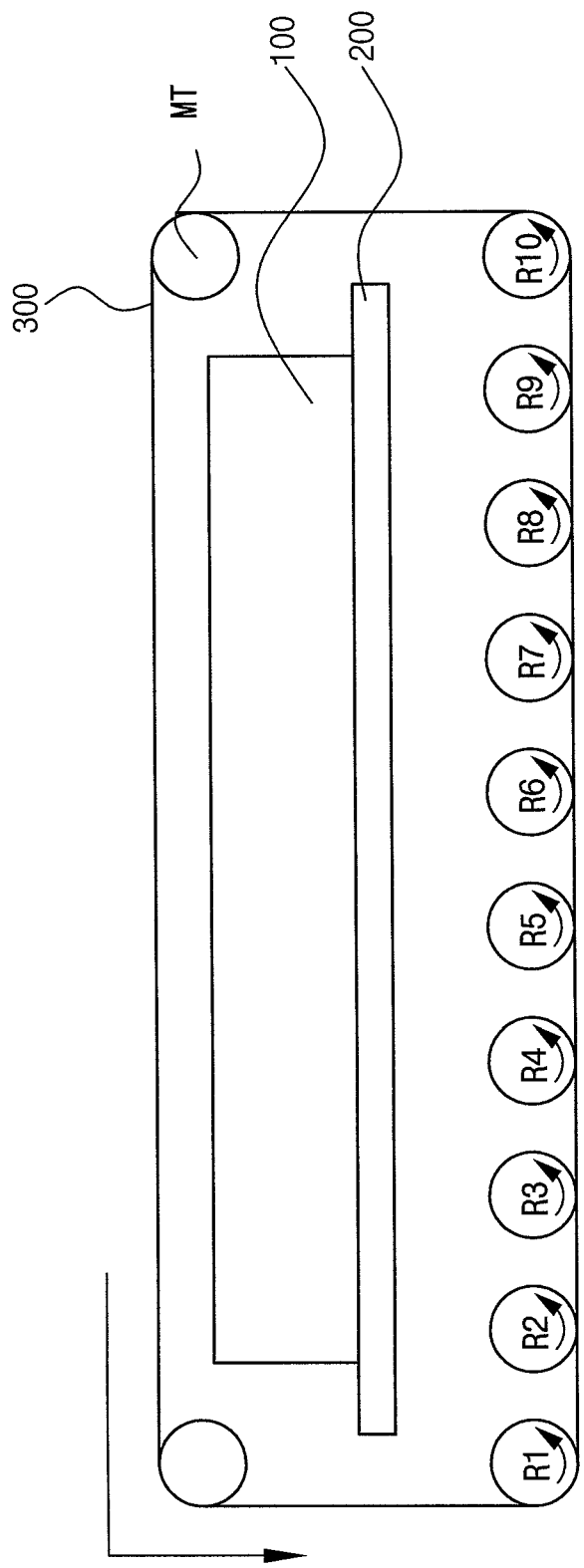
FIG. 7 is a cross-sectional view illustrating another modified exemplary embodiment of a display apparatus according to the invention.

FIG. 7 is a cross-sectional view illustrating another modified exemplary embodiment of a display apparatus according to the invention.

The display apparatus according to the present exemplary embodiment is substantially the same as the display apparatus of the previous exemplary embodiment explained referring to FIGS. 1 to 5 except that the radiation rollers are disposed inside the closed surface formed by the optical film. Thus, the same reference numerals will be used to refer to the same or like parts as those described in the previous exemplary embodiment of FIGS. 1 to 5 and any repetitive explanation concerning the above elements will be omitted.

Referring to FIG. 7, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 7 outside the optical film 300). In an exemplary embodiment, for example, in FIG. 7, the display apparatus may have an overall rectangular shape in cross-section, which defines four vertexes of the display apparatus in the cross-section. The display apparatus include two motors disposed at two of the upper vertexes of the rectangular shape to displace the enclosed optical film 300 in a path relative to the display panel 100. The radiation rollers may be disposed at two of the lower vertexes of the rectangular shape. Alternatively, the display apparatus may include four motors disposed at the four vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R10. The radiation rollers R1 to R10 may have cylindrical shapes.

In the present exemplary embodiment, the radiation rollers R1 to R10 may be disposed within the closed surface formed by the optical film 300 together with the motor MT.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 8:
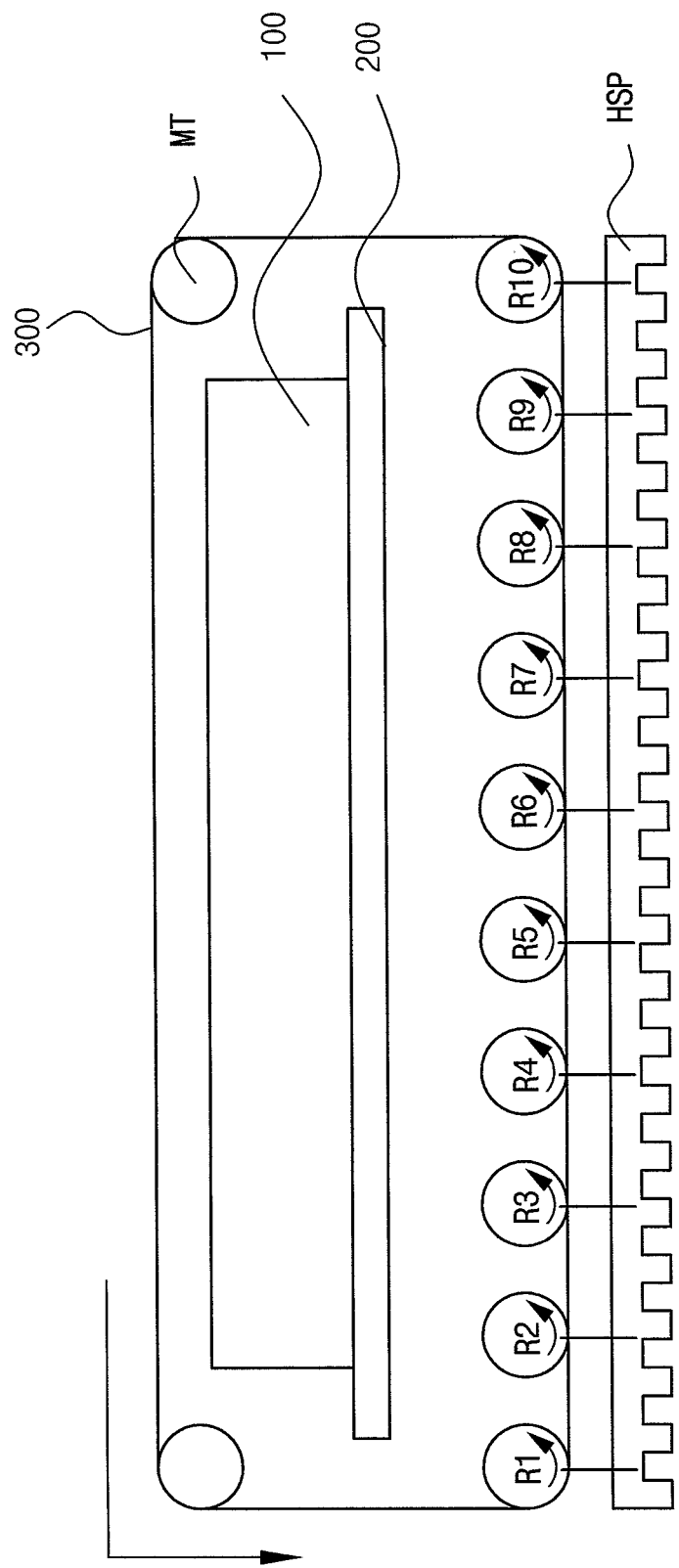
FIG. 8 is a cross-sectional view illustrating still another modified exemplary embodiment of a display apparatus according to the invention.

FIG. 8 is a cross-sectional view illustrating still another modified exemplary embodiment of a display apparatus according to the invention.

The display apparatus according to the present exemplary embodiment is substantially the same as the display apparatus of the previous exemplary embodiment explained referring to FIG. 7 except that the radiation element further includes the radiation plate connected to the radiation rollers. Thus, the same reference numerals will be used to refer to the same or like parts as those described in the previous exemplary embodiment of FIG. 7 and any repetitive explanation concerning the above elements will be omitted.

Referring to FIG. 8, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 8 outside the optical film 300). In an exemplary embodiment, for example, in FIG. 8, the display apparatus may have an overall rectangular shape in cross-section, which defines four vertexes of the display apparatus in the cross-section.

The display apparatus include two motors disposed at two of the upper vertexes of the rectangular shape to displace the enclosed optical film 300 in a path relative to the display panel 100. The radiation rollers may be disposed at two of the lower vertexes of the rectangular shape. Alternatively, the display apparatus may include four motors disposed at the four vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R10. The radiation rollers R1 to R10 may have cylindrical shapes.

In the present exemplary embodiment, the radiation rollers R1 to R10 may be disposed within the closed surface formed by the optical film 300 together with the motor MT.

In the present exemplary embodiment, the radiation element may further include a radiation plate HSP connected to the radiation rollers R1 to R10. The increase of the temperature of the display apparatus may be further reduced or effective prevented by the radiation plate HSP connected to the radiation rollers R1 to R10.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 9:
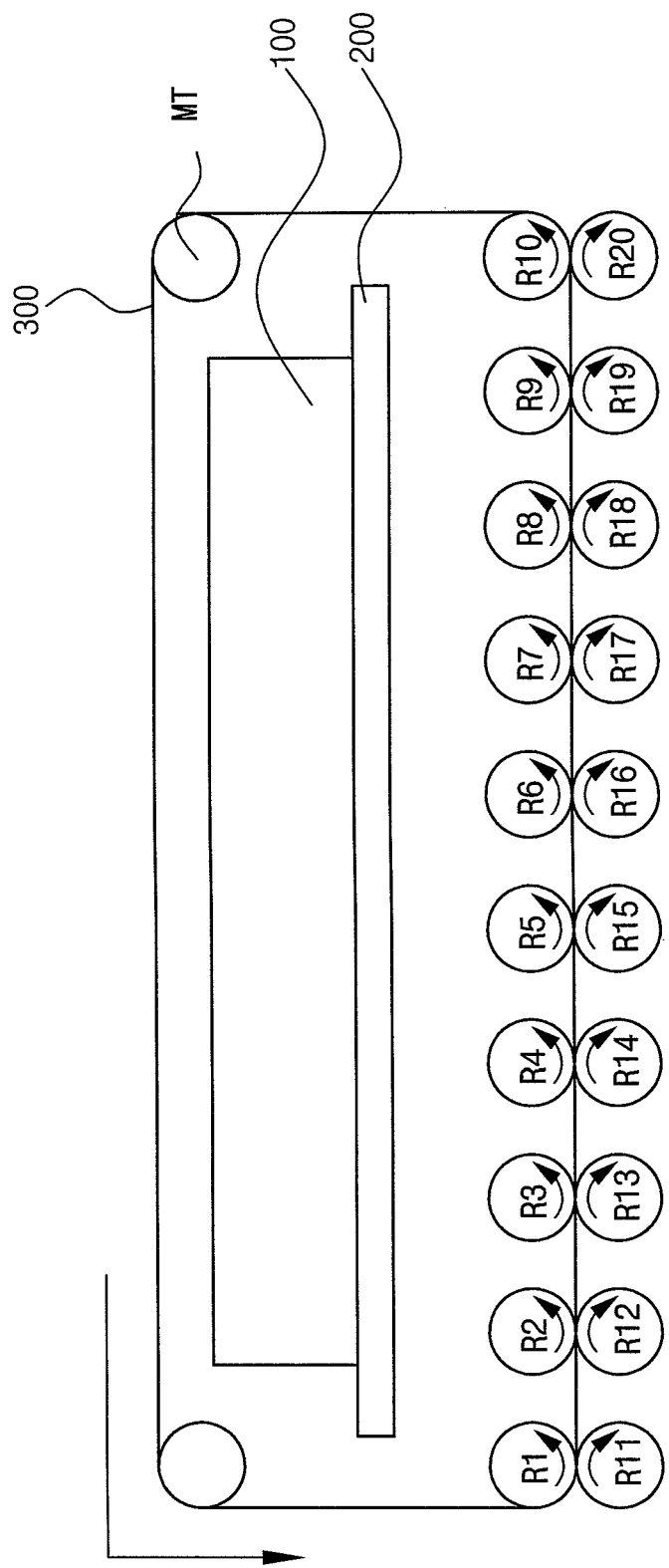
FIG. 9 is a cross-sectional view illustrating yet another modified exemplary embodiment of a display apparatus according to the invention.

FIG. 9 is a cross-sectional view illustrating yet another modified exemplary embodiment of a display apparatus according to the invention.

The display apparatus according to the present exemplary embodiment is substantially the same as the display apparatus of the previous exemplary embodiment explained referring to FIGS. 1 to 5 except that the radiation rollers are disposed both in and out of the closed surface formed by the optical film. Thus, the same reference numerals will be used to refer to the same or like parts as those described in the previous exemplary embodiment of FIGS. 1 to 5 and any repetitive explanation concerning the above elements will be omitted.

Referring to FIG. 9, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 9 outside the optical film 300). In an exemplary embodiment, for example, in FIG. 9, the display apparatus may have an overall rectangular shape in cross-section, which defines four vertexes of the display apparatus in the cross-section. The display apparatus include two motors disposed at two of the upper vertexes of the rectangular shape to displace the enclosed optical film 300 in a path relative to the display panel 100. The radiation rollers may be disposed at two of the lower vertexes of the rectangular shape. Alternatively, the display apparatus may include four motors disposed at the four vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R20. The radiation rollers R1 to R20 may have cylindrical shapes.

In the present exemplary embodiment, the radiation rollers R1 to R20 may be disposed both in and out of the closed surface formed by the optical film 300.

The radiation rollers R11 to R20 of a first group of rollers are disposed outside of the closed surface formed by the optical film 300. The radiation rollers R1 to R10 of a second group of rollers are disposed within the closed surface formed by the optical film 300.

In the present exemplary embodiment, the radiation rollers R11 to R20 of the first group may respectively face the radiation rollers R1 to R10 of the second group, with respect to a portion of the optical film 300.

In the present exemplary embodiment, the radiation rollers R11 to R20 of the first group may be disposed arranged in a first row and the radiation rollers R1 to R10 of the second group may be disposed arranged in a second row parallel to the first row. Each of the rows includes radiation rollers disposed in a same plane as each other, the rows of radiation rollers being disposed in different planes from each other.

The radiation rollers R11 to R20 of the first group rotate in a direction opposite to a rotating direction of the radiation rollers R1 to R10 of the second group (refer to the curved arrows within the shape of the rollers in FIG. 9).

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 10:
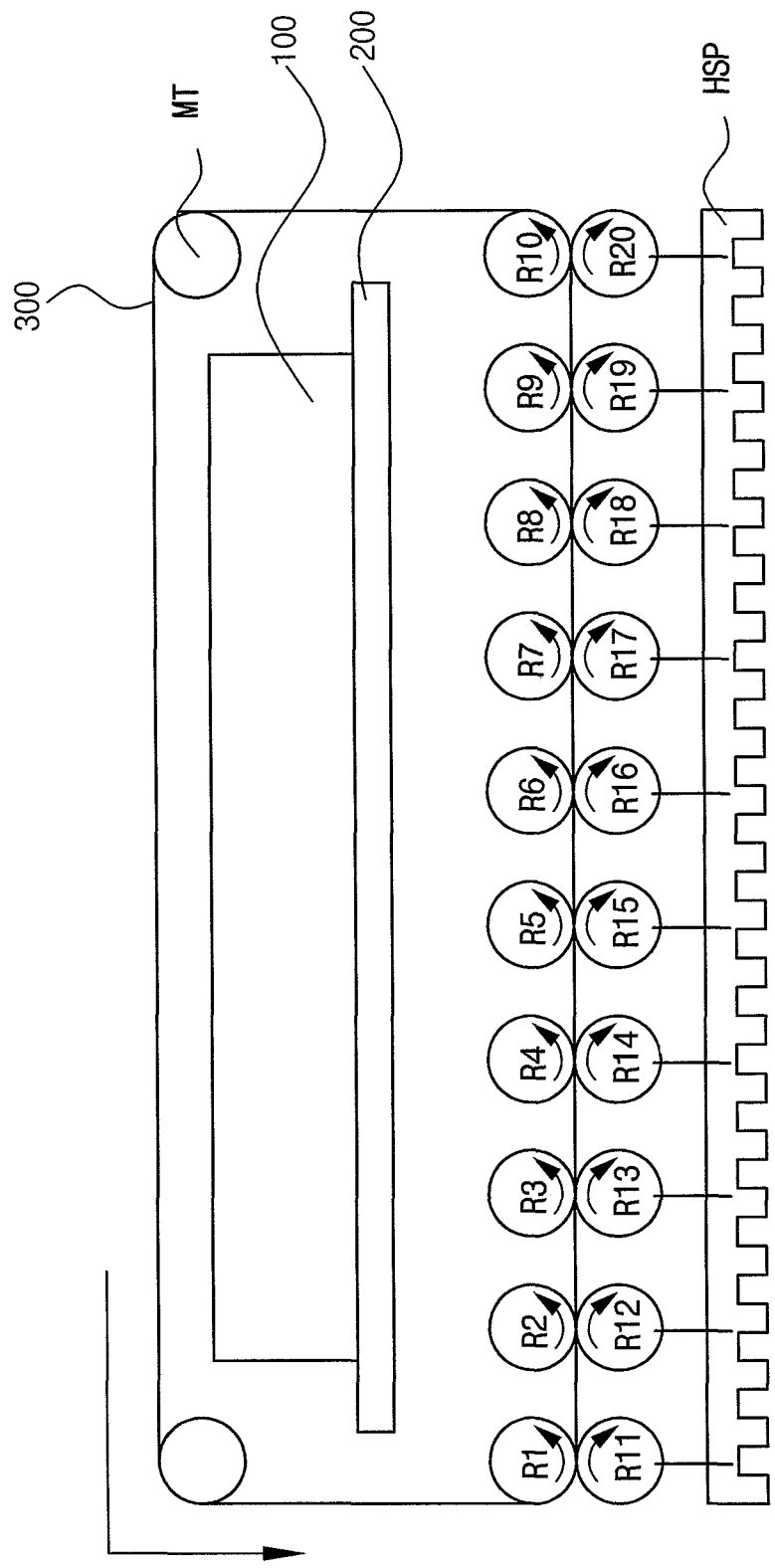
FIG. 10 is a cross-sectional view illustrating yet another modified exemplary embodiment of a display apparatus according to the invention.

FIG. 10 is a cross-sectional view illustrating yet another modified exemplary embodiment of a display apparatus according to the invention.

The display apparatus according to the present exemplary embodiment is substantially the same as the display apparatus of the previous exemplary embodiment explained referring to FIG. 9 except that the radiation element further includes the radiation plate connected to the radiation rollers. Thus, the same reference numerals will be used to refer to the same or like parts as those described in the previous exemplary embodiment of FIG. 9 and any repetitive explanation concerning the above elements will be omitted.

Referring to FIG. 10, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movables in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 10 outside the optical film 300). In an exemplary embodiment, for example, in FIG. 10, the display apparatus may have an overall rectangular shape in cross-section, which defines four vertexes of the display apparatus in the cross-section. The display apparatus include two motors disposed at two of the upper vertexes of the rectangular shape to displace the enclosed optical film 300 in a path relative to the display panel 100. The radiation rollers may be disposed at two of the lower vertexes of the rectangular shape. Alternatively, the display apparatus may include four motors disposed at four of the vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R20. The radiation rollers R1 to R20 may have cylindrical shapes.

In the present exemplary embodiment, the radiation rollers R1 to R20 may be disposed both in and out of the closed surface formed by the optical film 300.

The radiation rollers R11 to R20 of a first group of rollers are disposed outside of the closed surface formed by the optical film 300. The radiation rollers R1 to R10 of a second group rollers are disposed within the closed surface formed by the optical film 300.

In the present exemplary embodiment, the radiation rollers R11 to R20 of the first group may respectively face the radiation rollers R1 to R10 of the second group, with respect to a portion of the optical film 300.

In the present exemplary embodiment, the radiation rollers R11 to R20 of the first group may be disposed arranged in a first row and the radiation rollers R1 to R10 of the second group may be disposed arranged in a second row parallel to the first row.

The radiation rollers R11 to R20 of the first group rotate in a direction opposite to a rotating direction of the radiation rollers R1 to R10 of the second group (refer to the curved arrows within the shape of the rollers in FIG. 10).

In the present exemplary embodiment, the radiation element may further include a radiation plate HSP connected to the radiation rollers R11 to R20 of the first group. The increase of the temperature of the display apparatus may be further reduced or effectively prevented by the radiation plate HSP connected to the radiation rollers R11 to R20. Although not shown in figures, alternatively, the radiation plate HSP may be connected to the radiation rollers R1 to R10 of the second group.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 11:
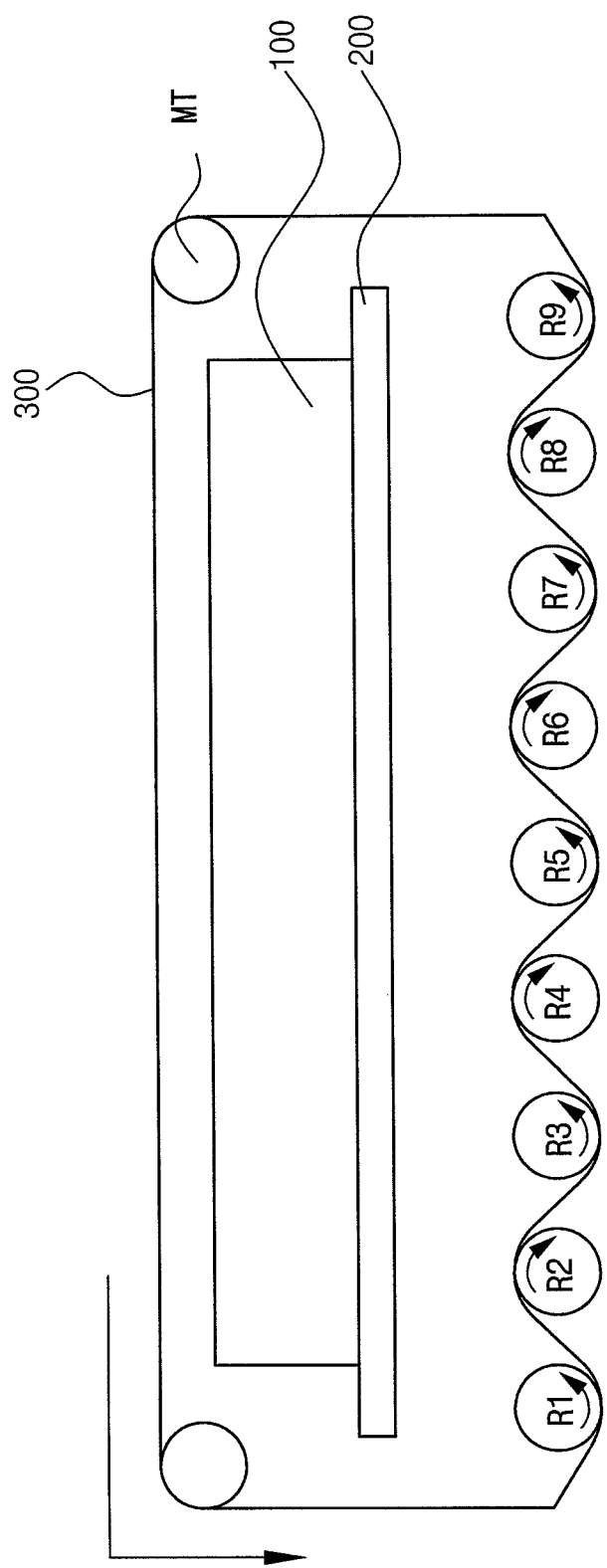
FIG. 11 is a cross-sectional view illustrating of another exemplary embodiment of a display apparatus according to the invention.

FIG. 11 is a cross-sectional view illustrating another exemplary embodiment of a display apparatus according to the invention.

The display apparatus according to the present exemplary embodiment is substantially the same as the display apparatus of the previous exemplary embodiment explained referring to FIGS. 1 to 5 except that a single row of the radiation rollers are disposed both inside and outside of the closed surface formed by the optical film. Thus, the same reference numerals will be used to refer to the same or like parts as those described in the previous exemplary embodiment of FIGS. 1 to 5 and any repetitive explanation concerning the above elements will be omitted.

Referring to FIG. 11, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 11 outside the optical film 300). In an exemplary embodiment, for example, in FIG. 11, the display apparatus may have an overall rectangular shape in cross-section, which defines four vertexes of the display apparatus in the cross-section. The display apparatus include two motors disposed at two of the upper vertexes of the rectangular shape to displace the optical film 300 in a path relative to the display panel 100. The radiation rollers may be disposed at two of the lower vertexes of the rectangular shape. Alternatively, the display apparatus may include four motors disposed at four of the vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R9. The radiation rollers R1 to R9 may have cylindrical shapes.

In the present exemplary embodiment, the radiation rollers R1 to R9 may be disposed both inside and outside of the closed surface formed by the optical film 300.

The radiation rollers R2, R4, R6 and R8 of a first group of rollers are disposed outside of the closed surface formed by the optical film 300. The radiation rollers R1, R3, R5, R7 and R9 of a second group of rollers are disposed in the closed surface formed by the optical film 300.

In the present exemplary embodiment, the radiation rollers R2, R4, R6 and R8 of the first group and the radiation rollers R1, R3, R5, R7 and R9 of the second group may be alternately disposed with each other along a direction (e.g., the second direction). A portion of the optical film 300 is disposed between each pair of radiation rollers adjacent to each other in the second direction.

In the present exemplary embodiment, the radiation rollers R2, R4, R6 and R8 of the first group and the radiation rollers R1, R3, R5, R7 and R9 of the second group may be disposed in a same single row. The radiation rollers R1 to R9 may be disposed in a substantially same plane as each other to alternate with each other along the second direction.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 12:
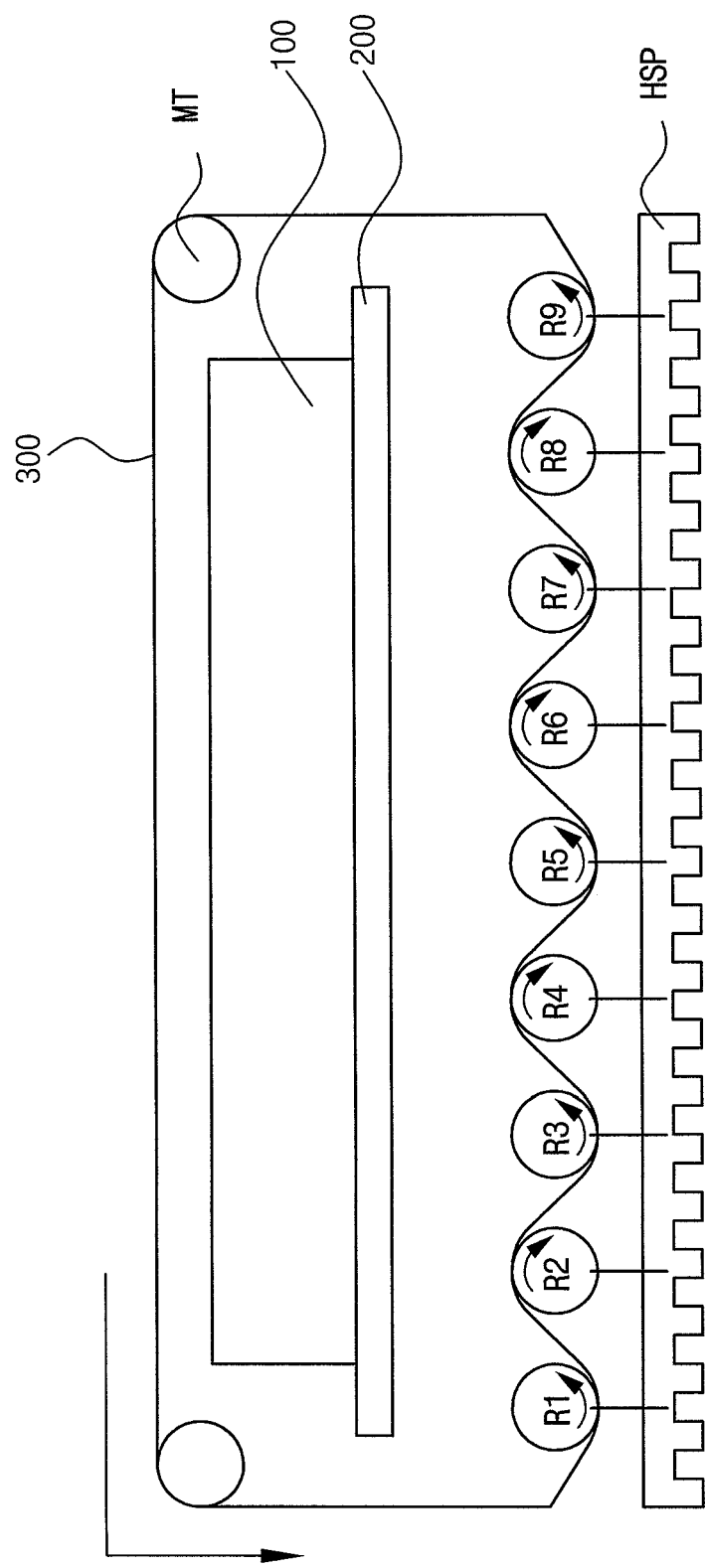
FIG. 12 is a cross-sectional view illustrating a modified exemplary embodiment of a display apparatus according to the invention.

FIG. 12 is a cross-sectional view illustrating a modified exemplary embodiment of a display apparatus according to the invention.

The display apparatus according to the present exemplary embodiment is substantially the same as the display apparatus of the previous exemplary embodiment explained referring to FIG. 11 except that the radiation element further includes the radiation plate connected to the radiation rollers. Thus, the same reference numerals will be used to refer to the same or like parts as those described in the previous exemplary embodiment of FIG. 11 and any repetitive explanation concerning the above elements will be omitted.

Referring to FIG. 12, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 makes contact with the display panel 100. The optical film 300 surrounds the display panel 100 and forms a closed surface surrounding the display panel 100. The display panel driver 200 may be disposed within the closed surface of the optical film 300.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 12 outside the optical film 300). In an exemplary embodiment, for example, in FIG. 12, the display apparatus may have an overall rectangular shape in cross-section, which defines four vertexes of the display apparatus in the cross-section. The display apparatus include two motors disposed at two of the upper vertexes of the rectangular shape to displace the optical film 300 in a path of the closed surface having the rectangular shape in a cross-sectional view. The radiation rollers may be disposed at two of the lower vertexes of the rectangular shape. Alternatively, the display apparatus may include four motors disposed at four of the vertexes of the rectangular shape to displace the optical film 300 in a path of the closed surface having the rectangular shape in a cross-sectional view.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R9. The radiation rollers R1 to R9 may have cylindrical shapes.

In the present exemplary embodiment, the radiation rollers R1 to R9 may be disposed both inside and outside of the closed surface formed by the optical film 300.

The radiation rollers R2, R4, R6 and R8 of a first group of rollers are disposed out of the closed surface formed by the optical film 300. The radiation rollers R1, R3, R5, R7 and R9 of a second group of rollers are disposed in the closed surface formed by the optical film 300.

In the present exemplary embodiment, the radiation rollers R2, R4, R6 and R8 of the first group and the radiation rollers R1, R3, R5, R7 and R9 of the second group may be alternately disposed with each other along a direction (e.g., the second direction). A portion of the optical film 300 is disposed between each pair of radiation rollers adjacent to each other in the second direction.

In the present exemplary embodiment, the radiation rollers R2, R4, R6 and R8 of the first group and the radiation rollers R1, R3, R5, R7 and R9 of the second group may be disposed in a same single row. The radiation rollers R1 to R9 may be disposed in a substantially same plane as each other to alternate with each other along the second direction In the present exemplary embodiment, the radiation element may further include a radiation plate HSP commonly connected to the radiation rollers R2, R4, R6 and R8 of the first group and the radiation rollers R1, R3, R5, R7 and R9. The increase of the temperature of the display apparatus may be further reduced or effectively prevented by the radiation plate HSP connected to the radiation rollers R1 to R9.

According to the present exemplary embodiment, the display apparatus includes the infrared ray absorbing film 300 surrounding the display panel 100 and displacing. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

Figure 13:
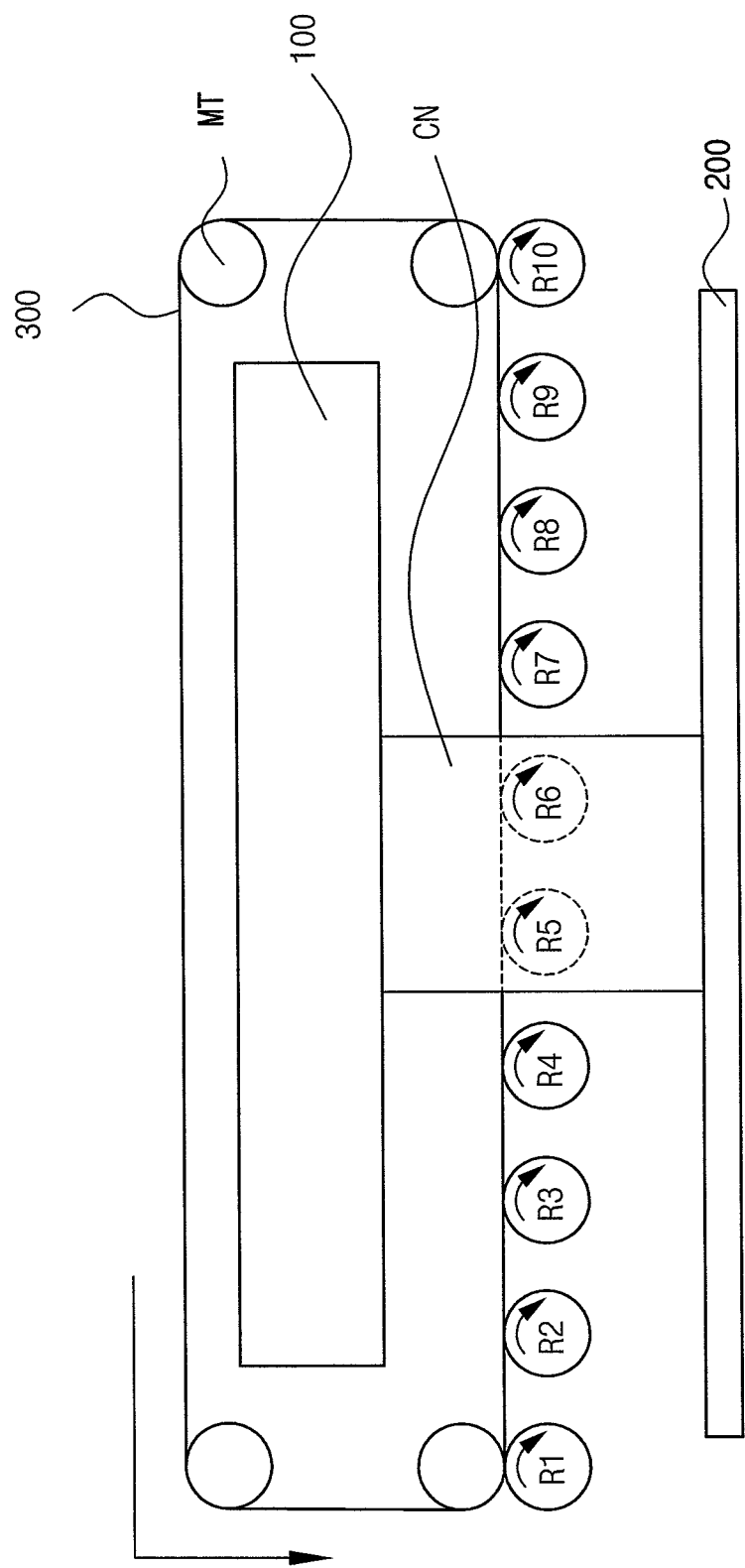
FIG. 13 is a cross-sectional view illustrating still another exemplary embodiment of a display apparatus according to the invention.

FIG. 13 is a cross-sectional view illustrating still another exemplary embodiment of a display apparatus according to the invention.

The display apparatus according to the present exemplary embodiment is substantially the same as the display apparatus of the previous exemplary embodiment explained referring to FIGS. 1 to 5 except that the display panel driver is disposed out of the closed surface formed by the optical film. Thus, the same reference numerals will be used to refer to the same or like parts as those described in the previous exemplary embodiment of FIGS. 1 to 5 and any repetitive explanation concerning the above elements will be omitted.

Referring to FIG. 13, the display apparatus includes a display panel 100, a display panel driver 200, an optical film 300 and a radiation element. In an exemplary embodiment, for example, the display apparatus may be an outdoor display apparatus used in an outdoor environment.

The display panel 100 displays an image. The display panel 100 may be a reflective display panel. The display panel 100 may be a reflective liquid crystal display panel. The display apparatus may not include a separate light source. The display panel 200 may reflect an external light to display the image. The external light may be the light of the sun.

The display panel driver 200 is connected to the display panel 100 to drive the display panel 100. In an exemplary embodiment, for example, the display panel driver 200 may include a timing controller, a gate driver, a gamma reference voltage generator and a data driver.

In the present exemplary embodiment, the display panel driver 200 is connected to the display panel 100 through a connecting part CN. The optical film 300 surrounds the display panel 100 and forms a closed surface surrounding the display panel 100. The display panel driver 200 may be disposed outside of the closed surface of the optical film 300. The connecting part CN may extend from the inside of to the outside of the closed surface of the optical film 300. The connecting part CN may include components which connect the display panel driver 200 to the display panel 100, such as conductive (signal) lines through which electrical power, control and/or driving signals area transmitted, insulating patterns or layers, and the like.

The optical film 300 surrounds the display panel 100 and is movable in a path surrounding the display panel 100. The optical film 300 may form a closed surface surrounding the display panel 100.

The display apparatus may include at least one motor MT to displace the optical film 300 relative to the display panel 100 (refer to the right-angle arrow in FIG. 13 outside the optical film 300. In an exemplary embodiment, for example, in FIG. 13, the display apparatus may have an overall rectangular shape in cross-section, which defines four vertexes of the display apparatus in the cross-section. The display apparatus include four motors disposed at four of the vertexes of a rectangular shape to displace the optical film 300 in a path relative to the display panel 100.

The radiation element makes contact with the optical film 300 and absorbs heat from the optical film 300. When the optical film 300 moves around the display panel 100 while at the same time making contact with the radiation element, the heat from the optical film 300 is transmitted to the radiation element and the radiation element releases the heat from the optical film 300 to outside of the display apparatus.

In an exemplary embodiment, for example, the radiation element may include a plurality of radiation rollers R1 to R10. The radiation rollers R1 to R10 may have cylindrical shapes.

In the present exemplary embodiment, the radiation rollers R1 to R10 may each be disposed outside of the closed surface formed by the optical film 300.

Alternatively, the radiation rollers R1 to R10 may each be disposed inside the closed surface formed by the optical film as shown in FIG. 7. Alternatively, the radiation rollers R1 to R20 may be disposed both inside and outside of the closed surface formed by the optical film, and the radiation rollers R1 to R10 inside the closed surface may face the radiation rollers R11 to R20 outside of the closed surface as shown in FIG. 9. Alternatively, a single row of the radiation rollers R1 to R9 may be disposed both inside and outside of the closed surface formed by the optical film, where the radiation rollers R1, R3, R5, R7 and R9 inside the closed surface and the radiation rollers R2, R4, R6 and R8 outside of the closed surface may be alternately disposed with each other in a same plane as shown in FIG. 11.

According to the present exemplary embodiment, the display apparatus includes the infrared ray absorbing film 300 surrounding the display panel 100 and movable with respect to the display panel 100 while at the same time being in contact with the radiation element. Thus, the increase of the temperature of the display apparatus due to the infrared ray of the sun may be reduced or effectively prevented.

Accordingly, the abnormal operation of the display apparatus due to the increase of the temperature may be reduced or effectively prevented so that the reliability and the display quality of the display apparatus may be improved.

In addition, the display panel driver 200 is spaced apart from the display panel 100 so that the temperature of the display panel 100 may not increase by heat generating in operating the display panel driver 200. In addition, the optical film 300 does not surround the display panel driver 200 but only surrounds the display panel 100 so that the overall size of the optical film 300 may be reduced.

According to one or more exemplary embodiment of the invention as explained above, the temperature of the display panel may be efficiently decreased or compensated so that the reliability and the display quality of the display apparatus including such display panel may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention. Like reference numerals refer to like elements throughout.

In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
   a display panel;
   an optical film which surrounds the display panel, the optical film movable around the display panel surrounded thereby; and
   a radiation element in contact with the optical film movable around the display panel to absorb heat from the optical film.

2. The display apparatus of claim 1, wherein the optical film movable around the display panel is an infrared ray absorbing film which absorbs an infrared ray incident thereto.

3. The display apparatus of claim 1, wherein the radiation element includes a plurality of radiation rollers each in contact with the optical film movable around the display panel, the plurality of radiation rollers spaced apart from each other along the optical film.

4. The display apparatus of claim 3, wherein the radiation element further includes a radiation plate connected to the radiation rollers, the radiation plate exposed to outside the display apparatus.

5. The display apparatus of claim 3, wherein each of the radiation rollers is disposed outside the optical film which surrounds the display panel.

6. The display apparatus of claim 3, wherein each of the radiation rollers is disposed inside the optical film which surrounds the display panel.

7. The display apparatus of claim 6, wherein the radiation element further includes a radiation plate connected to the radiation rollers, the radiation plate disposed outside the optical film which surrounds the display panel.

8. The display apparatus of claim 3, wherein the radiation element further includes:
   a first group of the radiation rollers which is disposed outside the optical film which surrounds the display panel; and
   a second group of the radiation rollers which is disposed inside the optical film which surrounds the display panel.

9. The display apparatus of claim 8, wherein the radiation rollers of the first group respectively face the radiation rollers of the second group with a portion of the optical film disposed therebetween.

10. The display apparatus of claim 9, wherein
    the radiation rollers of the first group are each disposed in a same first row, and
    the radiation rollers of the second group are each disposed in a same second row.

11. The display apparatus of claim 9, wherein the radiation rollers of the first group are rotatable in a rotating direction opposite to a rotating direction of the radiation rollers of the second group.

12. The display apparatus of claim 8, wherein
    the radiation rollers of the first group and the radiation rollers of the second group are alternately disposed with each other along the optical film, and
    a portion of the optical film is disposed between a first group radiation roller and a second group radiation roller adjacent to each other.

13. The display apparatus of claim 12, wherein the radiation rollers of the first group and the radiation rollers of the second group are disposed in a same plane as each other.

14. The display apparatus of claim 3, wherein in a top plan view of the display panel surrounded by the optical film, the radiation rollers are protruded further than the optical film to be disposed outside a side of the optical film.

15. The display apparatus of claim 1, further comprising a motor connected to the optical film movable around the display and by which the optical film is movable around the display panel.

16. The display apparatus of claim 1, further comprising a display panel driver connected to the display panel to drive the display panel to display an image,
    the display panel driver disposed inside the optical film which surrounds the display panel.

17. The display apparatus of claim 1, further comprising a display panel driver connected to the display panel to drive the display panel to display an image,
    the display panel driver disposed outside the optical film which surrounds the display panel.

18. The display apparatus of claim 1, wherein the display panel comprises:
    a first substrate;
    a second substrate facing the first substrate;
    an optical medium layer which controls transmittance of light through the display panel to display an image, the optical medium layer disposed between the first substrate and the second substrate; and a reflective plate which reflects external light incident to the display panel, the reflective plate disposed between the first substrate and the optical medium layer.

19. A display apparatus comprising:
a display panel comprising:
   a first substrate,
   a second substrate facing the first substrate,
   an optical medium layer which controls transmittance of light through the display panel to display an image, the optical medium layer disposed between the first substrate and the second substrate, and
a reflective plate which reflects external light incident to the display panel, the reflective plate disposed between the first substrate and the optical medium layer;
an infrared ray absorbing film which absorbs an infrared ray incident thereto, the infrared ray absorbing film surrounding the display panel to be movable around the display panel; and
a plurality of radiation rollers each in contact with the infrared ray absorbing film movable around the display panel to absorb heat from the infrared ray absorbing film.

20. The display apparatus of claim 19, further comprising a motor connected to the infrared ray absorbing film movable around the display panel and by which the infrared ray absorbing film is movable around the display panel.

* * * * *